(12) United States Patent
Wu et al.

(10) Patent No.: US 8,510,631 B2
(45) Date of Patent: Aug. 13, 2013

(54) MULTI-CHANNEL MEMORY APPARATUS AND METHOD THEREOF

(75) Inventors: Chien-Chung Wu, Kaohsiung (TW); Ching-Hao Yu, Yilan County (TW); Li-Lien Lin, Hsinchu (TW); Chao-Yi Wu, Kaohsiung County (TW)

(73) Assignee: Mediatek Inc., Hsin-Chu (TW)

( * ) Notice: Subject to any disclaimer, the term of this patent is extended or adjusted under 35 U.S.C. 154(b) by 705 days.

(21) Appl. No.: 12/624,553

(22) Filed: Nov. 24, 2009

(65) Prior Publication Data

US 2011/0126079 A1  May 26, 2011

(51) Int. Cl.
*G06F 11/00* (2006.01)

(52) U.S. Cl.
USPC .......................................................... 714/764

(58) Field of Classification Search
USPC .......................................................... 714/764
See application file for complete search history.

(56) References Cited

U.S. PATENT DOCUMENTS

| | | | |
|---|---|---|---|
| 7,055,082 B2 * | 5/2006 | Mori et al. ................. | 714/768 |
| 7,281,193 B2 * | 10/2007 | Wu et al. .................... | 714/758 |
| 7,415,660 B2 * | 8/2008 | Chen et al. .................. | 714/784 |
| 7,523,376 B2 * | 4/2009 | Hsueh et al. ................ | 714/752 |
| 7,865,809 B1 * | 1/2011 | Lee et al. .................... | 714/782 |
| 8,060,806 B2 * | 11/2011 | Shalvi et al. ................ | 714/763 |
| 2004/0015772 A1 * | 1/2004 | Nagai et al. ................. | 714/764 |
| 2005/0022096 A1 * | 1/2005 | Kim et al. .................... | 714/762 |
| 2006/0107172 A1 * | 5/2006 | Hsueh et al. ................ | 714/752 |
| 2007/0061691 A1 * | 3/2007 | Lin et al. ..................... | 714/800 |
| 2008/0195900 A1 * | 8/2008 | Chang et al. ................ | 714/718 |
| 2009/0024902 A1 * | 1/2009 | Jo et al. ....................... | 714/763 |
| 2009/0044078 A1 | 2/2009 | Vogan et al. | |

FOREIGN PATENT DOCUMENTS

CN 1195827 10/1998

OTHER PUBLICATIONS

English language translation of abstract of CN 1195827 (published Oct. 14, 1998).

* cited by examiner

*Primary Examiner* — Bryce Bonzo
*Assistant Examiner* — Elmira Mehrmanesh
(74) *Attorney, Agent, or Firm* — McClure, Qualey & Rodack, LLP

(57) ABSTRACT

A multi-channel memory apparatus is provided. The multi-channel memory apparatus includes a host interface, storage channels, an error correcting module, and a multiple memory access module. The host interface is arranged to receive and transmit data from and to a host device. Each storage channel is coupled to a memory device for storing the data. The error correcting module is shared by the storage channels, includes an error correction code engine and a data buffer, and is arranged to perform error correction code encoding on the data to be stored into the memory devices and perform error correction code decoding on the data read out from the memory devices. The multiple memory access module is coupled between the storage channels and the error correcting module and arranged to perform multiple access control of the storage channels for the error correcting module.

21 Claims, 9 Drawing Sheets

MULTI-CHANNEL MEMORY APPARATUS AND METHOD THEREOF

BACKGROUND OF THE INVENTION

1. Field of the Invention

The invention relates to a multi-channel memory apparatus, and more particularly to a multi-channel memory apparatus utilizing an efficient ECC encoding and decoding scheme.

2. Description of the Related Art

Mass storage devices may include a number of memory devices, such as NAND memory devices, NOR memory devices, phase change devices, magnetic media devices, optical storage, etc., that typically include single-channel (i.e., one per memory device) controllers. Such single channel device controllers typically include error correcting code (ECC) encoding and decoding just before the data is written to or read from the storage device.

ECC encoding typically produces so-called check bytes used to correct data errors resulting from data storage in the device when reading data out of the storage device. In each channel, if no error is detected during decoding, the channel presents a properly decoded data output. Alternatively, if an error is detected during decoding, the channel presents a decode Error Detection Code (EDC) error output.

Along with the increase in the amount of channels in the mass storage devices, an efficient ECC encoding and decoding scheme to protect data is highly required.

BRIEF SUMMARY OF THE INVENTION

Multi-channel memory apparatus are provided. An embodiment of a multi-channel memory apparatus comprises a host interface, a plurality of storage channels, an error correcting module and a multiple memory access module. The host interface is arranged to receive and transmit data from and to a host device. Each storage channel is coupled to a memory device for storing the data. The error correcting module is shared by the storage channels, comprises an error correction code (ECC) engine and a data buffer, and is arranged to perform error correction code encoding on the data to be stored into the memory devices and perform error correction code decoding on the data read out from the memory devices. The multiple memory access module is coupled between the storage channels and the error correcting module and arranged to perform multiple access control of the storage channels for the error correcting module.

Another embodiment of a multi-channel memory apparatus comprises a host interface, a plurality of storage channels, a scrambler module, an error correcting module and a multiple memory access module. The host interface is arranged to receive and transmit data from and to a host device. Each storage channel is coupled to a memory device for storing the data. The scrambler module is arranged to perform intra-channel disarrangement for the data to be stored into the memory devices and rearrange the scrambled data read out from the memory devices. The error correcting module is shared by the storage channels, comprises an error correction code (ECC) engine and a data buffer, and is arranged to perform error correction code encoding on the data to be stored into the memory devices and perform error correction code decoding on the data read out from the memory devices. The multiple memory access module is coupled between the storage channels and the error correcting module and arranged to perform multiple access control of the storage channels for the error correcting module.

An embodiment of a method for accessing a multi-channel memory apparatus comprising a plurality of memory devices each associated with a storage channel comprising: receiving source data to be stored into the memory devices from a host device; encoding the source data by an error correction code (ECC) engine, wherein the ECC engine is shared by the storage channels; disarranging the encoded data to be stored in each specific memory device; and writing the disarranged data to the memory devices.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
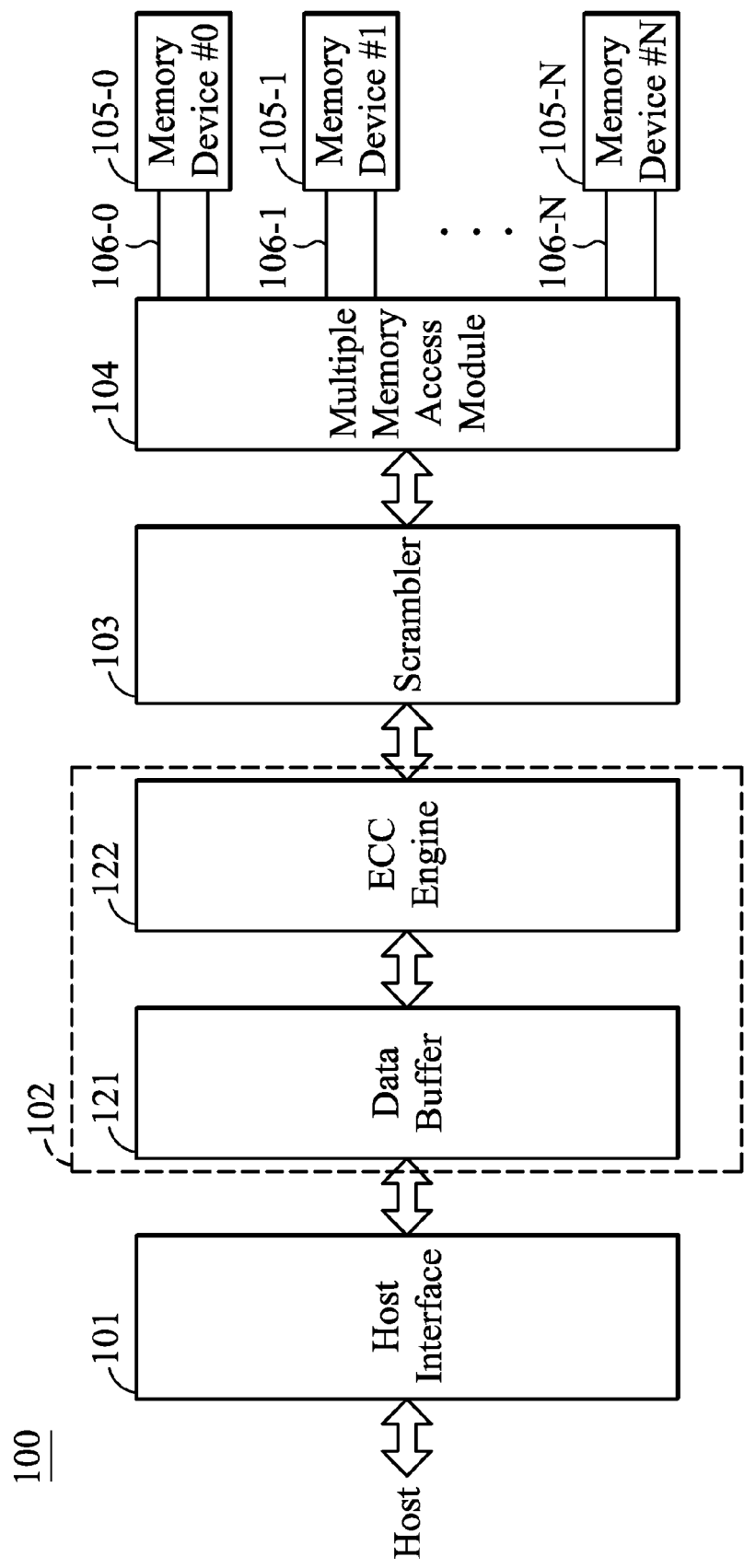
FIG. 1 shows a multi-channel memory apparatus according to an embodiment of the invention.

FIG. 1 shows a multi-channel memory apparatus according to an embodiment of the invention. The multi-channel memory apparatus 100 may be located within and communicate with a host device. The host device may be a computing or media device, as an example, a notebook, a cellular phone, a gaming device, a multimedia player, a Global Positioning System (GPS), or others. The multi-channel memory apparatus 100 comprises a host interface 101, an error correcting module 102, a scrambler 103, a multiple memory access module 104, a plurality of storage channels and a plurality of memory devices 105-0, 105-1 to 105-N. Each storage channel 106-0 to 106-N is coupled to a memory device (such as memory device 105-0, 105-1 to 105-N) for storing the data. The host interface 101 is arranged to communicate with the host device. As an example, the host interface 101 may interpret host commands and receive data from or transmit data to the host device depending on the data transferring directions (e.g. write or read directions). The error correcting module 102 is shared by the storage channels and is arranged to perform error correction code encoding on the data to be stored into the memory devices and perform error correction code decoding on the data read out from the memory devices, depending on the data transferring directions (e.g. write or read directions).

The scrambler 103 may be implemented in a scrambler module (not shown) and is arranged to perform intra-channel disarrangement for the data to be stored into the memory devices and rearrange the scrambled data read out from the memory devices in a reverse manner depending on the data transferring directions (e.g. write or read directions). The intra-channel disarrangement is a disarrangement operation performed within a channel so as to scramble the data of the same codeword of the ECC engine. The scrambler 103 scrambles the data so as to randomly distribute the data '0' and '1' in adjacent locations. Thus, interference introduced by the adjacent data of continuous '0' or '1' within the memory device 105-0 to 105-N is reduced. Note that because the scrambling process is a linear operation, the scrambler (scrambler module) may be located anywhere in the data transferring paths (e.g. write or read paths). In addition, according to another embodiment of the invention, the scrambler module may also comprise a plurality of scramblers to deal with the scrambling of the multiple storage channels (which will be discussed in detail in the following paragraphs).

The multiple memory access module 104 is coupled between the storage channels and the error correcting module 102 and arranged to perform multiple access control of the storage channels for the error correcting module 102. As an example, the multiple memory access module 104 multiplexes the data received simultaneously from different memory devices 105-0 to 105-N to the error correcting module 102. The memory devices 105-0 to 105-N may be arranged to provide non-volatile storage of data. As an example, the memory device 105-0 to 105-N may be a NAND or NOR type flash, a solid state disk, a Static Random Access Memory (SRAM), a Dynamic Random Access Memory (DRAM) . . . etc.

According to an embodiment of the invention, the error correcting module 102 may comprise an error correction code (ECC) engine 122 and a data buffer 121 coupled in serial between the host interface 101 and the multiple memory access module 104. The ECC engine 122 is arranged to perform error correction code encoding and decoding to protect the data. The data buffer 121 is arranged to store host data temporarily while read or write operations are in progress.

Figure 2:
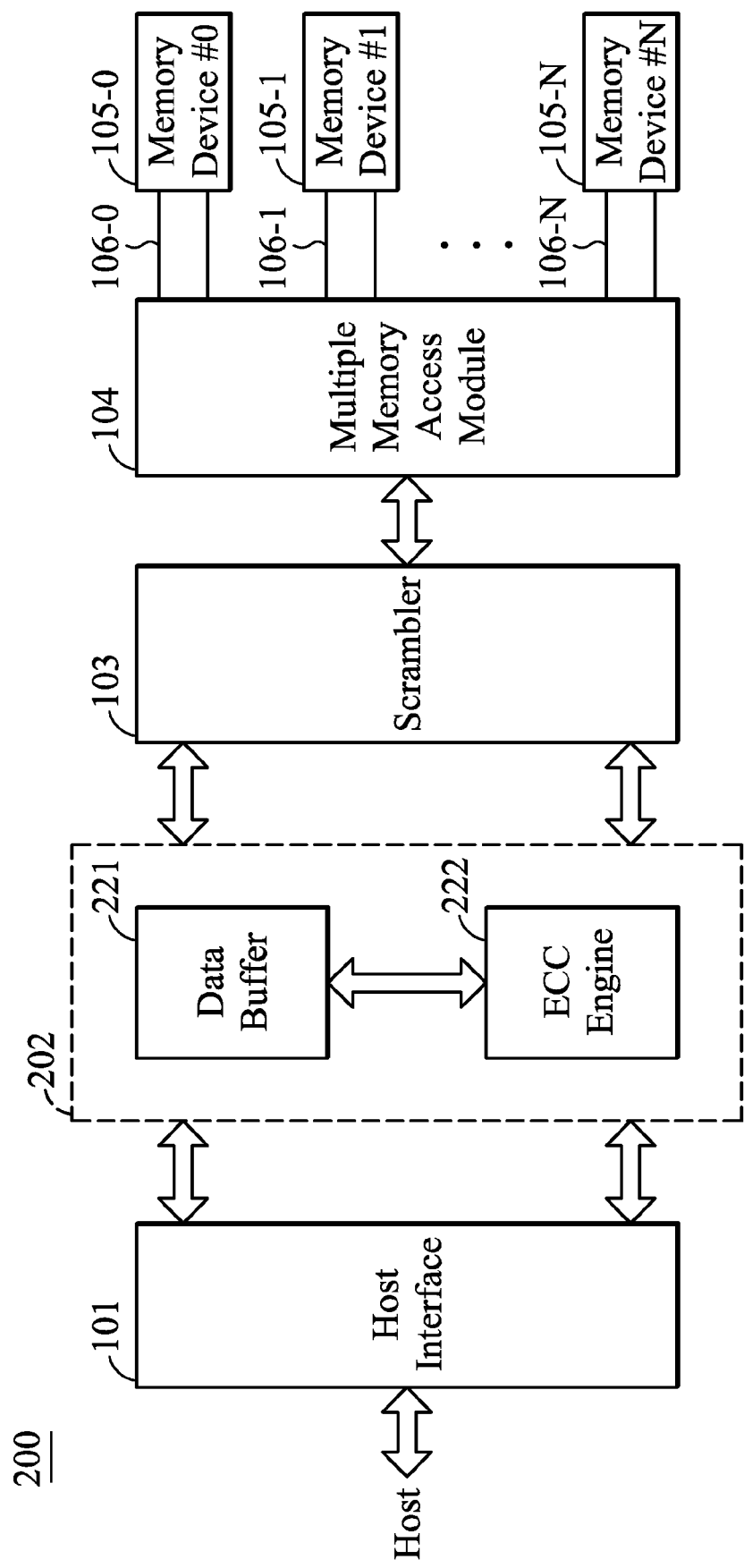
FIG. 2 shows a multi-channel memory apparatus according to another embodiment of the invention.

FIG. 2 shows a multi-channel memory apparatus according to another embodiment of the invention. The multi-channel memory apparatus 200 comprises a host interface 101, an error correcting module 202, a scrambler 103, a multiple memory access module 104, a plurality of storage channels 106-0 to 106-N and a plurality of memory devices 105-0 to 105-N. For detailed description of the host interface 101, the scrambler 103, the multiple memory access module 104, the memory devices 105-0 to 105-N, the ECC engine 222 and data buffer 221, reference may be made to FIG. 1 and the corresponding descriptions, thus further descriptions are omitted here for brevity. In some embodiments of the invention, the ECC engine 222 and the data buffer 221 may also be coupled in parallel between the host interface 101 and the multiple memory access module 104. The data buffer 221 may store the protection data, which is used to correct data errors, of the source data stored in the memory devices for the ECC engine 222. Therefore, instead of reading the protection data from the memory devices, the ECC engine 222 may obtain the protection data directly from the data buffer 221, making the decoding process in the parallel structure more efficient. Note that in the embodiments of the invention, the error correcting module 102 is shared by the storage channels so that an ECC engine does not need to be associated with a storage channel. As shown in FIG. 1 and FIG. 2, an amount of ECC engines is less than an amount of the storage channels. Therefore, the cost and chip area required by the ECC engines may be greatly reduced.

Figure 3:
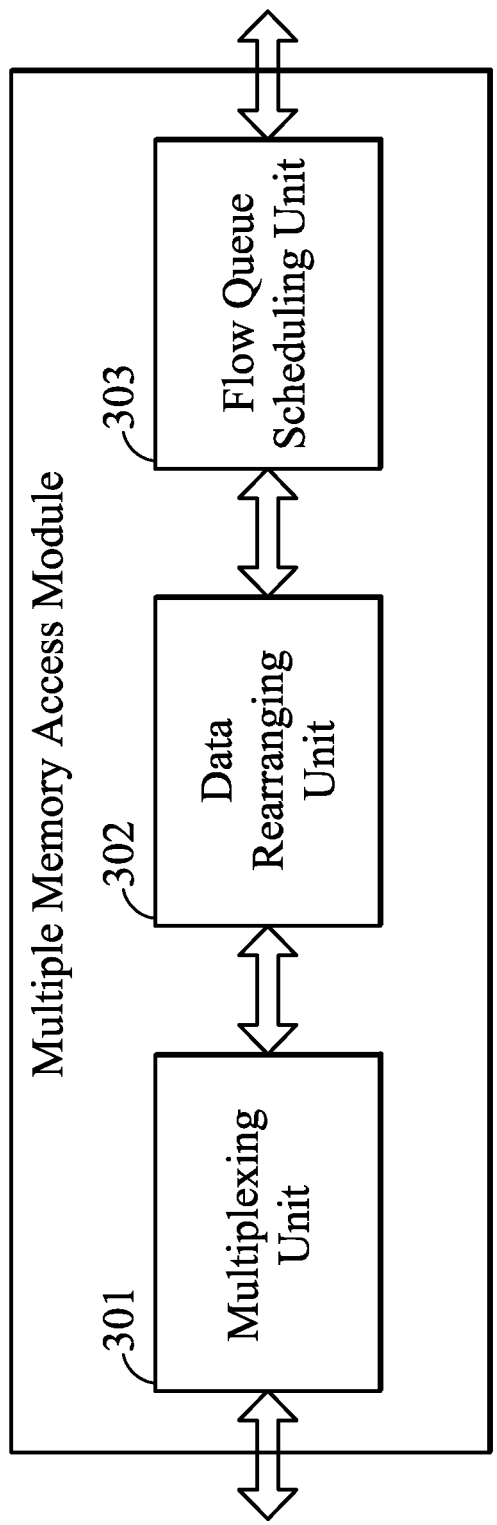
FIG. 3 shows a block diagram of a multiple memory access module according to an embodiment of the invention.

FIG. 3 shows a block diagram of a multiple memory access module according to an embodiment of the invention. The multiple memory access module may comprise a multiplexing unit 301, a data rearranging unit 302 and a flow queue scheduling unit 303. The multiplexing unit 301 is coupled to the error correcting module 102 or 202 and arranged to multiplex the data to be transmitted to the error correcting module, or to de-multiplex the data received from the error correcting module. According to an embodiment of the invention, the multiplexing unit 301 may multiplex the data in an order of the index of the storage channels, as an example, from the storage channel 106-0 to 106-N, or from the storage channel 106-N to 106-0. The data rearranging unit 302 is arranged to perform inter-channel disarrangement for the data received from the multiplexing unit and to be stored into the memory devices, and rearrange the data read out from memory devices through the storage channels in a reverse manner depending on the data transferring directions (e.g. write or read directions). The inter-channel disarrangement is to further enhance the disorderliness of the data by exchanging the data of different storage channels so that the same type of data may not all be stored in the same memory device. The purpose of the disarrangement operation is to randomly place the data between channels so as to further reduce inter-channel interference. The flow queue scheduling unit 303 is arranged to schedule a plurality of flow queues of the data to be stored into the memory devices and the data read out from the memory devices. As an example, the flow queue scheduling unit 303 may queue the data to be stored into the corresponding memory devices until the amount of arrived data reaches a predetermined data size, thus improving the power and time efficiency of the multi-channel memory apparatus.

Figure 4:
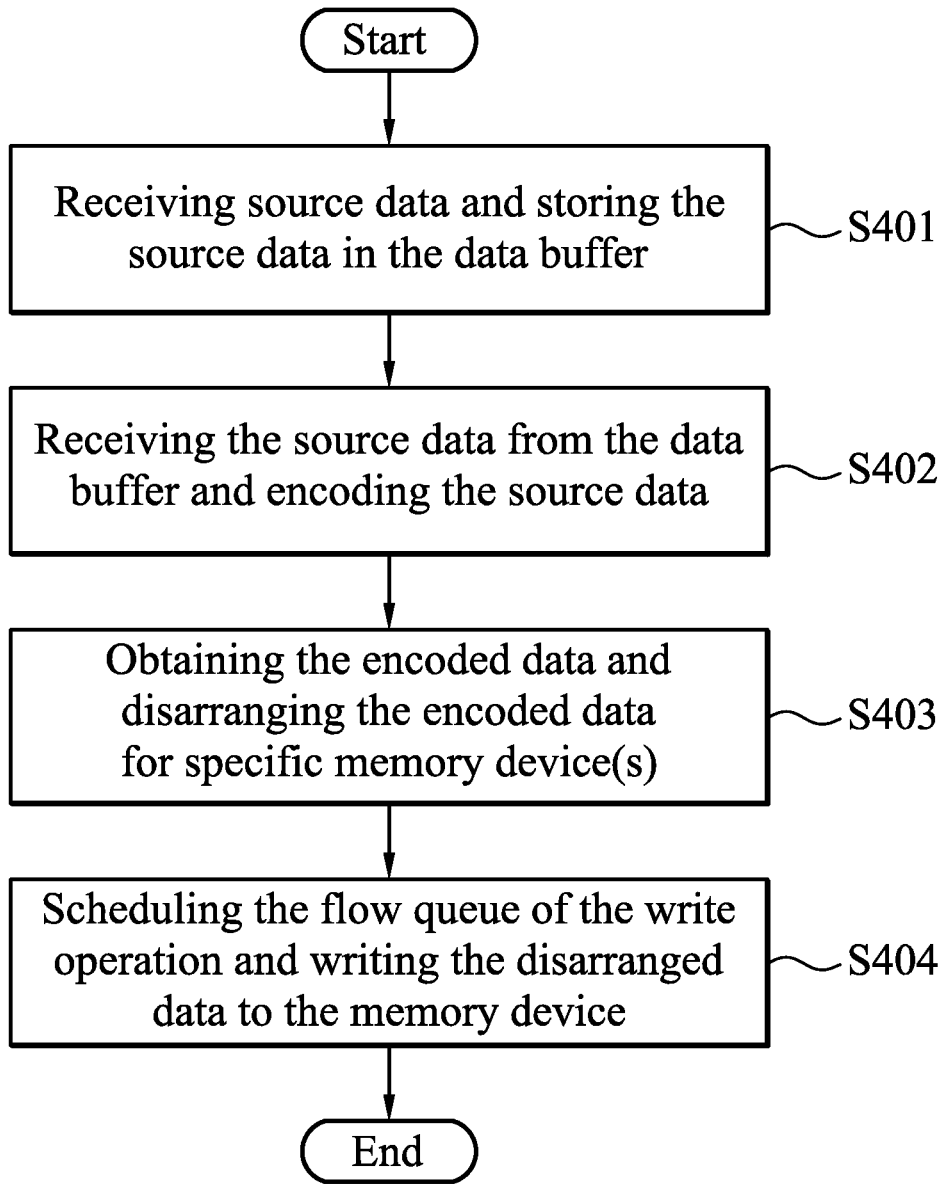
FIG. 4 shows a flow chart of a write operation according to an embodiment of the invention.

FIG. 4 shows a flow chart of a write operation according to an embodiment of the invention. The host interface first receives source data from the host device and stores the source data in the data buffer (Step S401). Next, the ECC engine receives the source data from the data buffer and encodes the source data (Step S402). Next, the multiple memory access module obtains the encoded data from the ECC engine and disarranges the encoded data for specific memory device(s) (Step S403). Finally, the multiple memory access module schedules the flow queue of the write operation and writes the disarranged data to the memory device (Step S404).

Figure 5:
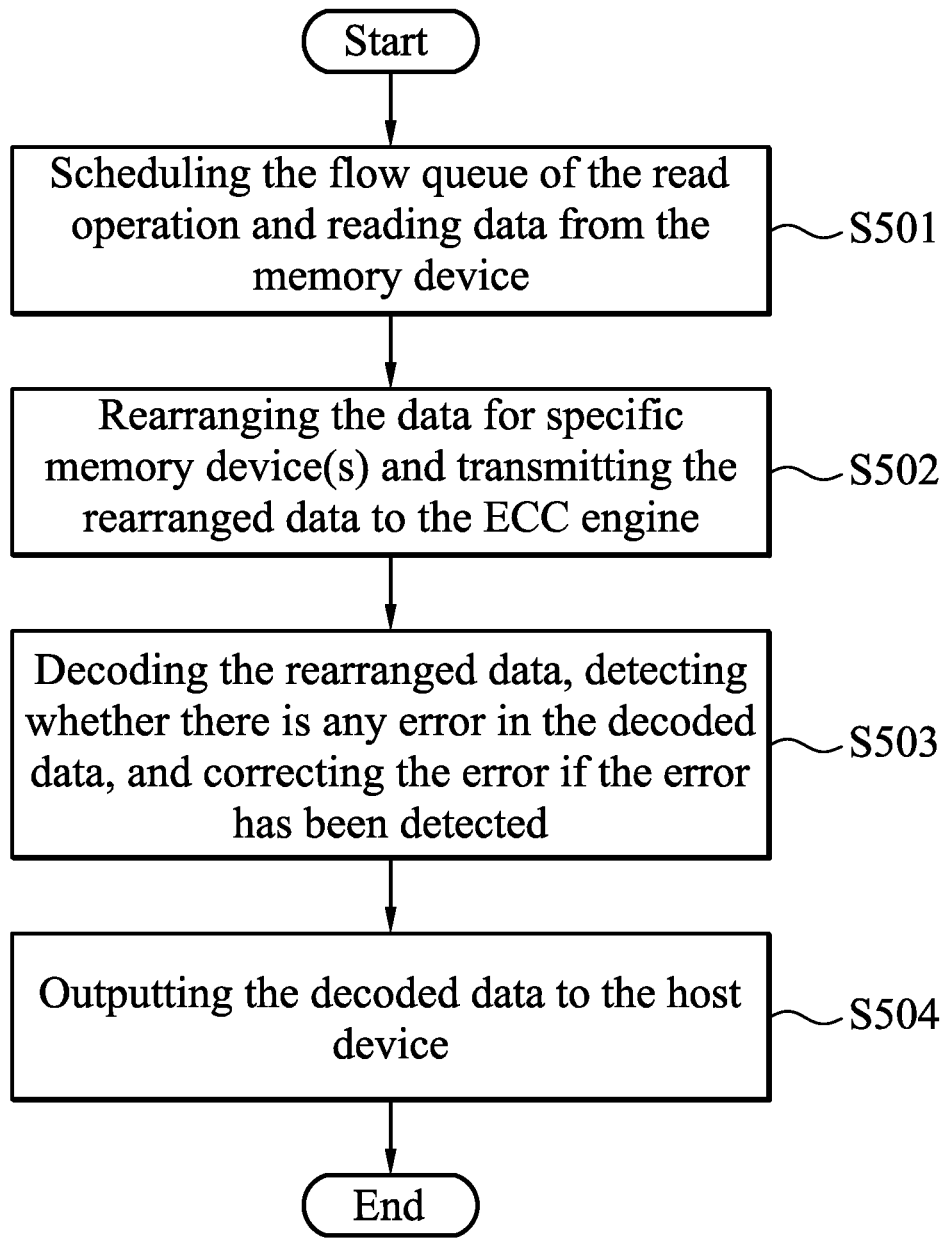
FIG. 5 shows a flow chart of a read operation according to an embodiment of the invention.

FIG. 5 shows a flow chart of a read operation according to an embodiment of the invention. The multiple memory access module first schedules the flow queue of the read operation and reads data from the memory device (Step S501). Next, the multiple memory access module rearranges the data for specific memory device(s) and transmits the rearranged data to the ECC engine (Step S502). Next, the ECC engine decodes the rearranged data, detects whether there is any error in the decoded data, and corrects the error if the error has been detected (Step S503). Finally, the host interface outputs the decoded data to the host device (Step S504).

As previously described, because the scrambling process is a linear operation, the scrambler (scrambler module) 103 as shown in FIG. 1 and FIG. 2 may be placed anywhere in the data transferring paths (e.g. write or read paths). According to an embodiment of the invention, as shown in FIG. 1 and FIG. 2, the scrambler 103 may be coupled between the error correcting module 102 or 202 and the multiple memory access module 104, and arranged to perform intra-channel disarrangement for the data to be stored into the memory devices and rearrange the data read out from the memory devices.

Figure 6:
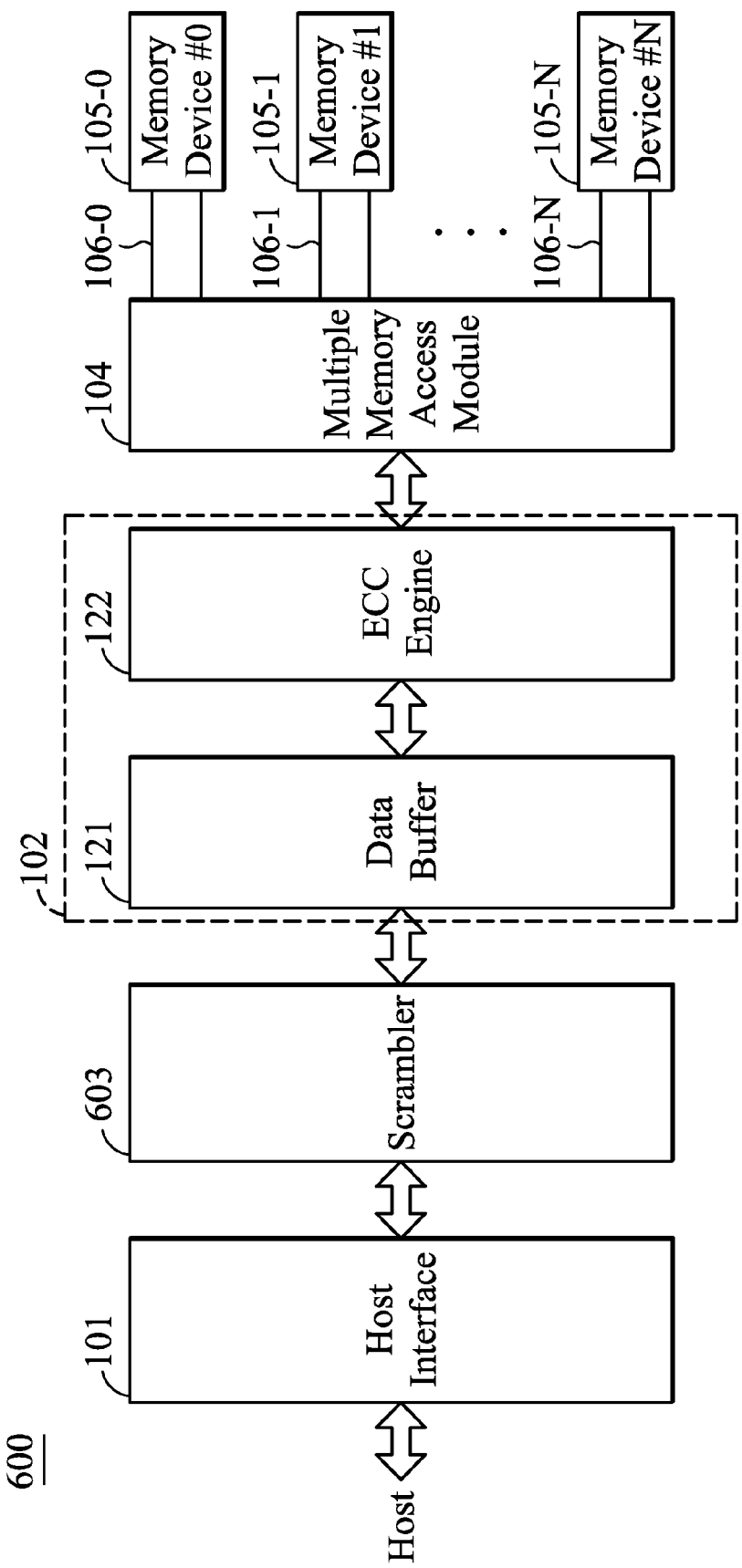
FIG. 6 shows a multi-channel memory apparatus according to another embodiment of the invention.

FIG. 6 shows a multi-channel memory apparatus 600 according to another embodiment of the invention. As shown in FIG. 6, the scrambler 603 is coupled between the host interface 101 and the error correcting module 102 and arranged to perform intra-channel disarrangement for the data to be stored into the memory devices and rearrange the data read out from the memory devices. In addition, according to yet another embodiment of the invention, a plurality of scramblers may also be utilized in a scrambler module of the multi-channel memory apparatus.

Figure 7:
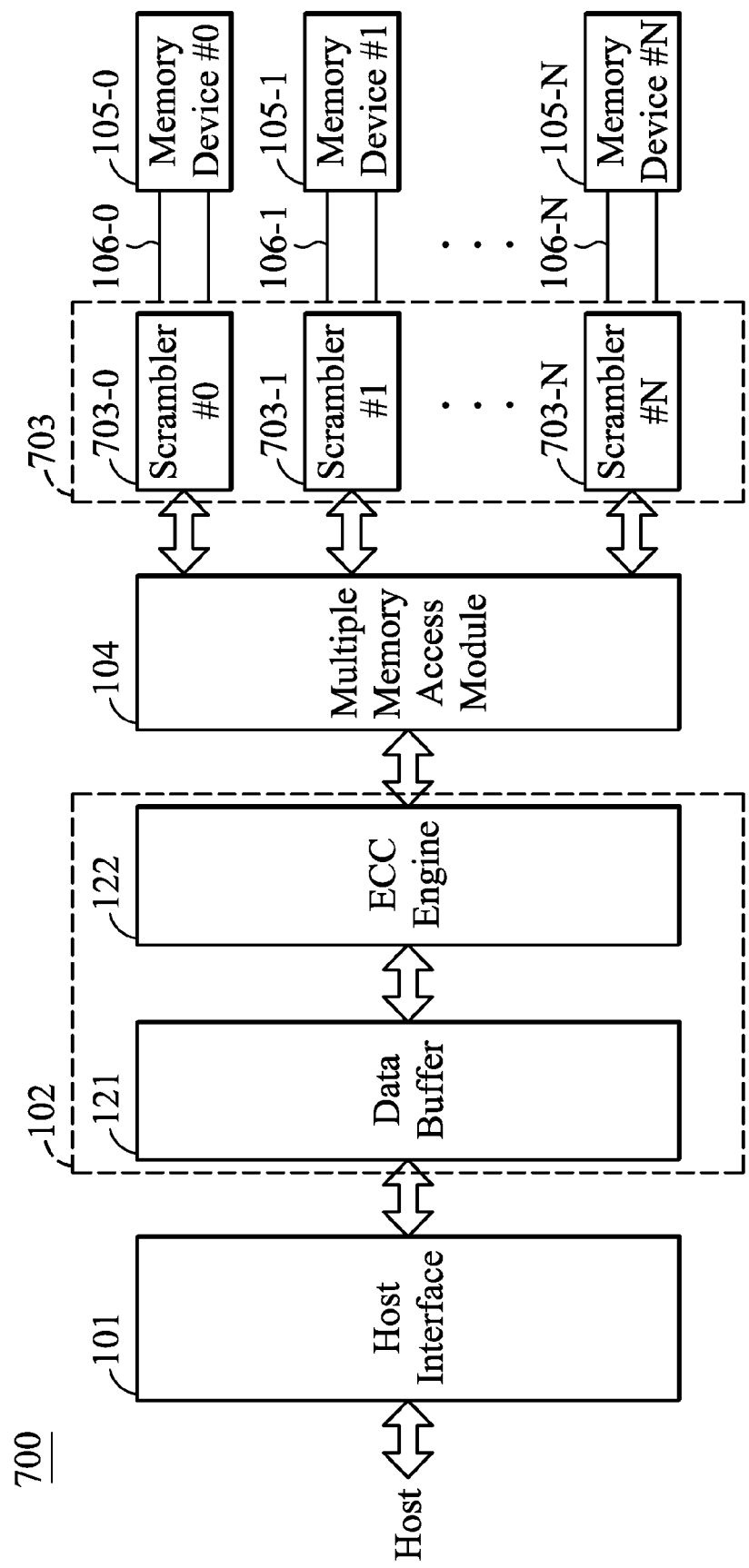
FIG. 7 shows a multi-channel memory apparatus according to another embodiment of the invention.

FIG. 7 shows yet another multi-channel memory apparatus 700 according to another embodiment of the invention. As shown in FIG. 7, the scrambler module 703 may comprise a plurality of scramblers, such as the scramblers 703-0 to 703-N each coupled to a storage channel and arranged to perform intra-channel disarrangement for the data to be stored into the corresponding memory device and rearrange the data read out from the corresponding memory device. Note that the operations of the scramblers 603 and 703-0 to 703-N are similar to the scrambler 103 as shown in FIG. 1 and FIG. 2. For detailed description of the host interface 101, the error correcting module 102, the scramblers 603 and 703-0 to 703-N, the multiple memory access module 104, and the memory devices 105-0 to 105-N as shown in FIG. 6 and FIG. 7, reference may be made to FIG. 1 and FIG. 2 and the corresponding descriptions, thus further descriptions are omitted here for brevity.

Figure 8:
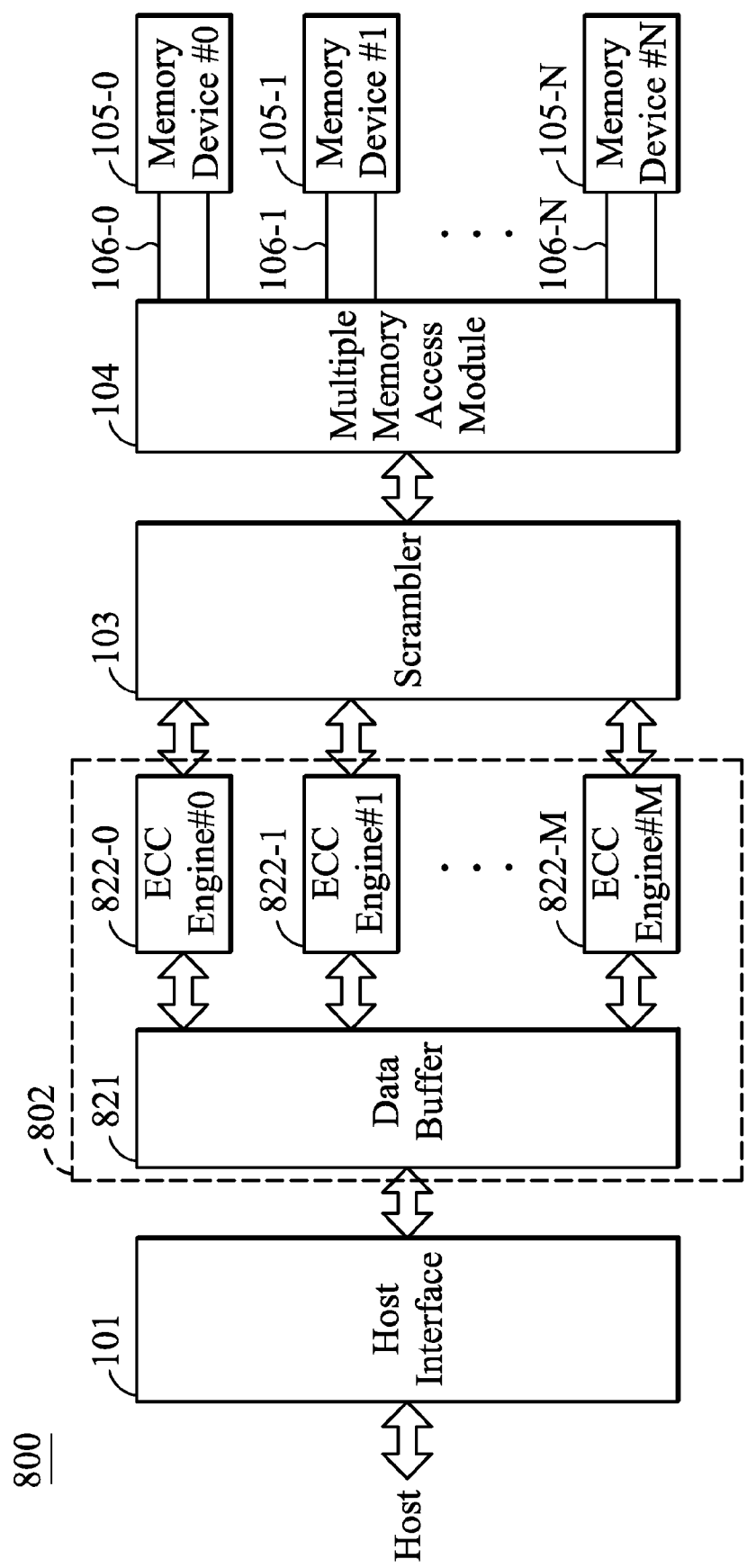
FIG. 8 shows a multi-channel memory apparatus according to another embodiment of the invention.

FIG. 8 shows a multi-channel memory apparatus 800 according to another embodiment of the invention. In the embodiment, the error correcting module 802 may comprises an ECC engine 822-0 and a plurality of sub-ECC engines 822-1 to 822-M coupled in parallel with the ECC engine 822-0. The operations of the sub-ECC engines 822-1 to 822-M for performing error correction code encoding and decoding on the data to be stored in the memory devices are similar to the operations of the ECC engine 822-0. Therefore, the multi-channel memory apparatus 800 may be regarded as comprising a plurality of ECC engines 822-0, 822-1 to 822-M. According to the embodiment of the invention, the value M may be less than the value N. That is, an amount of ECC engines and sub-ECC engines may be less than an amount of the storage channels. Note that the operations of the data buffer 821 and the ECC engine/sub-ECC engines 822-0 to 822-M are similar to the data buffer 121 and the ECC engine 122 as shown in FIG. 1. For detailed description of the host interface 101, the data buffer 821, the ECC engine/sub-ECC engines 822-0 to 822-M, the scramblers 103, the multiple memory access module 104, and the memory devices 105-0 to 105-N as shown in FIG. 8, reference may be made to FIG. 1 and FIG. 2 and the corresponding descriptions, thus further descriptions are omitted here for brevity.

Figure 9:
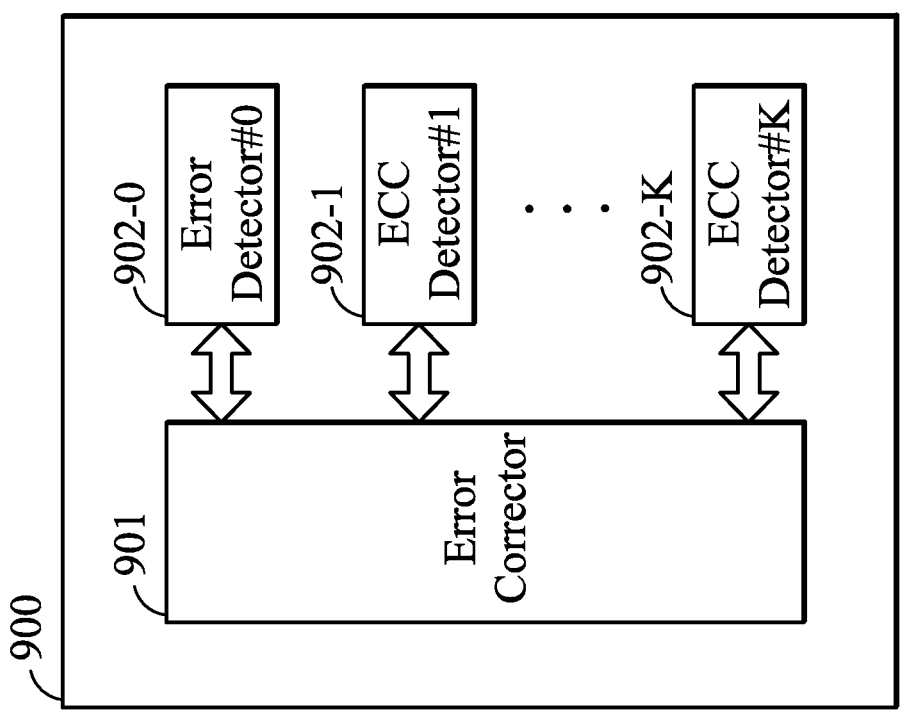
FIG. 9 shows a block diagram of an ECC engine/sub-ECC engine according to an embodiment of the invention.

FIG. 9 shows a block diagram of an ECC engine/sub-ECC engine according to an embodiment of the invention. The ECC engine/sub-ECC engine 900 may comprise one or more error detectors 902-0 to 902-K and an error corrector 901. The error detectors 902-0 to 902-K are arranged to perform error correction code encoding on the data to be stored into the memory devices and error correction code decoding on the data read out from the memory devices, depending on the data transferring directions (e.g. write or read directions), and detect error(s) in the data read out from the memory devices. According to the embodiments of the invention, the ECC engine (such as the ECC engine 122, 222, 822-0 to 822-M and 900 . . . etc.) is arranged to perform suitable ECC algorithm, such as Reed-Solomon or Bose, Ray-Chaudhuri, Hocquenghem (BCH) encoding and decoding. The error corrector 901 is shared by the error detectors 902-0 to 902-K and arranged to correct the error(s) of the data detected by the error detectors. According to an embodiment of the invention, a multiplication result of the amount of ECC engines and sub-ECC engines multiplied by an amount of the error detectors may be equal to or less than the amount of the storage channels, as an example, (M+1)×(K+1) (N+1). Note that the structure of the ECC engine/sub-ECC engine 900 shown in FIG. 9 may also be applicable to the ECC engine 122 as shown in FIG. 1, the ECC engine 222 as shown in FIG. 2, the ECC engines as shown in FIG. 6 and FIG. 7 and the ECC engine/sub-ECC engines 822-0 to 822-M as shown in FIG. 8, and the invention should not be limited thereto. It is further noted that although the data buffers and the ECC engines/sub-ECC engines as shown in FIG. 6, FIG. 7 and FIG. 8 are coupled in serial in the corresponding error correcting modules, those data buffers and ECC engines/sub-ECC engines are applicable to be coupled in parallel in the corresponding error correcting modules as shown in FIG. 2 and the invention should not be limited thereto.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A multi-channel memory apparatus, comprising:
a host interface, arranged to receive and transmit data from and to a host device;
a plurality of storage channels, each coupled to a memory device for storing the data;
an error correcting module, shared by the storage channels, comprising an error correction code (ECC) engine and a data buffer, and arranged to perform error correction code encoding on the data to be stored into the memory devices and perform error correction code decoding on the data read out from the memory devices;
a multiple memory access module, coupled between the storage channels and the error correcting module and arranged to perform multiple access control of the storage channels for the error correcting module; and
a scrambler module, coupled to the error correcting module, wherein the scrambler module comprises a plurality of scramblers, each of the scramblers is coupled to the storage channel correspondingly and arranged to perform intra-channel disarrangement for the data to be stored into the corresponding memory device and rearrange the scrambled data read out from the corresponding memory device.

2. The multi-channel memory apparatus as claimed in claim 1, wherein the ECC engine and the data buffer are coupled in serial between the host interface and the multiple memory access module.

3. The multi-channel memory apparatus as claimed in claim 2, wherein the error correcting module further comprises a plurality of sub-ECC engines coupled in parallel with the ECC engine, and wherein an amount of the ECC engine and the sub-ECC engines is less than an amount of the storage channels.

4. The multi-channel memory apparatus as claimed in claim 1, wherein the ECC engine and the data buffer are coupled in parallel between the host interface and the multiple memory access module.

5. The multi-channel memory apparatus as claimed in claim 4, wherein the error correcting module further comprises a plurality of sub-ECC engines coupled in parallel with the ECC engine, and wherein an amount of the ECC engine and the sub-ECC engines is less than an amount of the storage channels.

6. The multi-channel memory apparatus as claimed in claim 1, wherein the multiple memory access module comprises:
 a multiplexing unit, coupled to the error correcting module and arranged to multiplex the data to be transmitted to the error correcting module and de-multiplex the data received from the error correcting module;
 a data rearranging unit, arranged to perform inter-channel disarrangement for the data received from the multiplexing unit and to be stored into the memory devices, and rearrange the data read out from the memory devices; and
 a flow queue scheduling unit, arranged to schedule a plurality of flow queues of the data to be stored into the memory devices and the data read out from the memory devices.

7. The multi-channel memory apparatus as claimed in claim 1, wherein the scrambler module is coupled between the error correcting module and the multiple memory access module.

8. The multi-channel memory apparatus as claimed in claim 1, wherein the scrambler module is coupled between the host interface and the error correcting module.

9. The multi-channel memory apparatus as claimed in claim 1, wherein the ECC engine comprises:
 a plurality of error detectors, each arranged to perform error correction code encoding on the data to be stored into the memory devices, perform error correction code decoding on the data read out from the memory devices and detect error(s) in the data read out from the memory devices; and
 an error corrector, shared by the error detectors and arranged to correct the error(s) of the data detected by the error detectors.

10. A multi-channel memory apparatus, comprising:
 a host interface, arranged to receive and transmit data from and to a host device;
 a plurality of storage channels, each coupled to a memory device for storing the data;
 a scrambler module, comprising a plurality of scramblers, each of the scramblers is coupled to the storage channel correspondingly and arranged to perform intra-channel disarrangement for the data to be stored into the corresponding memory device and rearrange the scrambled data read out from the corresponding memory device;
 an error correcting module, shared by the storage channels, comprising an error correction code (ECC) engine and a data buffer, and arranged to perform error correction code encoding on the data to be stored into the memory devices and perform error correction code decoding on the data read out from the memory devices; and
 a multiple memory access module, coupled between the storage channels and the error correcting module and arranged to perform multiple access control of the storage channels for the error correcting module.

11. The multi-channel memory apparatus as claimed in claim 10, wherein the ECC engine and the data buffer are coupled in serial or parallel between the host interface and the multiple memory access module.

12. The multi-channel memory apparatus as claimed in claim 11, wherein the error correcting module further comprises a plurality of sub-ECC engines coupled in parallel with the ECC engine, and wherein an amount of ECC engines and sub-ECC engines is less than an amount of the storage channels.

13. The multi-channel memory apparatus as claimed in claim 12, wherein the ECC engine comprises:
 a plurality of error detectors, each arranged to perform error correction code encoding on the data to be stored into the memory devices, perform error correction code decoding on the data read out from the memory devices and detect error(s) in the data read out from the memory devices; and
 an error corrector, shared by the error detectors and arranged to correct the error(s) of the data detected by the error detectors.

14. The multi-channel memory apparatus as claimed in claim 13, wherein a multiplication result of the amount of the ECC engine and the sub-ECC engines multiplied by an amount of the error detectors is equal to or less than the amount of the storage channels.

15. The multi-channel memory apparatus as claimed in claim 10, wherein the multiple memory access module comprises:
 a multiplexing unit, coupled to the error correcting module and arranged to multiplex the data to be transmitted to the error correcting module and de-multiplex the data received from the error correcting module;
 a data rearranging unit, arranged to perform inter-channel disarrangement for the data received from the multiplexing unit and to be stored into the memory devices, and rearrange the data read out from the memory devices; and
 a flow queue scheduling unit, arranged to schedule a plurality of flow queues of the data to be stored into the memory devices and the data read out from the memory devices.

16. The multi-channel memory apparatus as claimed in claim 10, wherein the scrambler module is coupled between the error correcting module and the multiple memory access module.

17. The multi-channel memory apparatus as claimed in claim 10, wherein the scrambler module is coupled between the host interface and the error correcting module.

18. The multi-channel memory apparatus as claimed in claim 10, wherein the ECC engine is arranged to perform Reed-Solomon or Bose, Ray-Chaudhuri, Hocquenghem (BCH) encoding and decoding.

19. A method for accessing a multi-channel memory apparatus comprising a plurality of memory devices each associated with a storage channel comprising:
 receiving source data to be stored into the memory devices from a host device;
 encoding the source data by an error correction code (ECC) engine, wherein the ECC engine is shared by the storage channels;
 disarranging the encoded data to be stored in each specific memory device by performing intra-channel disarrangement for the data to be stored into the corresponding memory device;
 de-multiplexing the encoded data received from the ECC engine to different memory devices; and
 scheduling a flow queue for storing the de-multiplexed data in the corresponding memory devices; and
 writing the disarranged data to the memory devices.

20. The method as claimed in claim 19, further comprising:
receiving a read data request from the host device;
schedules a flow queue of a read operation to read data from the memory devices;
rearranging the encoded data for each specific memory device;
multiplexing the rearranged data from different memory devices to the ECC engine;
decoding the rearranged data, detecting whether there is any error in the decoded data and correcting the error when the error has been detected by the ECC engine; and
outputting the decoded data to the host device.

21. The method as claimed in claim 20, an amount of the ECC engine is less than an amount of the storage channels.

* * * * *